United States Patent [19]
Carlen

[11] Patent Number: 5,272,927
[45] Date of Patent: Dec. 28, 1993

[54] ANTI-BACKLASH SPLINE COUPLING FOR USE IN A POSITION MEASURING SYSTEM

[75] Inventor: Eric T. Carlen, Roanoke, Va.

[73] Assignee: Carlen Controls, Inc., Roanoke, Va.

[21] Appl. No.: 892,312

[22] Filed: Jun. 3, 1992

[51] Int. Cl.$^5$ .............................................. G01D 7/02
[52] U.S. Cl. .................................. 73/866.1; 33/657; 33/710
[58] Field of Search ................ 73/866.1; 33/DIG. 14, 33/710, 711, 657, 556, 613; 100/99, 168-171; 403/359, 366, 311, 166; 464/147, 161, 98, 99, 88

[56] References Cited
U.S. PATENT DOCUMENTS

| 3,561,359 | 2/1971 | Cohen | 100/168 |
| 4,033,252 | 7/1977 | Baker | 100/99 |
| 4,453,421 | 6/1984 | Umano | 100/99 |
| 5,029,400 | 7/1991 | Leclercq et al. | 33/657 |

OTHER PUBLICATIONS

Gutmann, "18 Ways to Control Backlash in Gearing", Product Engineering, Oct. 1959, pp. 71-75.
Sterling Instrument Catalog (Imagitron Sales Co., Inc.) Splines and Splined Bushings pp. 1-30 and 1-31 Copyright 1991.
Winfred M. Berg, Inc. Catalog Anti-Backlash Gears p. B272 Copyright 1988.

*Primary Examiner*—Robert Raevis
*Attorney, Agent, or Firm*—Sterne, Kessler, Goldstein & Fox

[57] ABSTRACT

An anti-backlash spline coupling configured to have the identical rotation as a spline shaft with which it is engaged. The coupling includes two plates and tensioning means which bias the rotary movement of each plate against the other. The coupling may be used in a position measuring system to accurately measure the rotation of a workpiece which is subject to both vertical and rotary motion.

12 Claims, 8 Drawing Sheets

ANTI-BACKLASH SPLINE COUPLING FOR USE IN A POSITION MEASURING SYSTEM

FIELD OF THE INVENTION

This invention relates to an anti-backlash spline coupling for use in a position measuring system. More particularly, the anti-backlash spline coupling is used in a system for measuring the vertical travel of a rolling mill screw.

BACKGROUND OF THE INVENTION

In processing steel or other metals, large rolls in a stack are used to compress the metal to reduce the thickness of the material going through the mill. A screwdown, such as a rolling mill screw, is used in the mill to press the rolls in the stack tighter together to achieve more reduction in the thickness of the processed metal. Precise determination of the position of the rolling mill screw is required to control the thickness of the rolled material leaving the mill in order to ensure that it will be that which is desired.

One method used for determining the position of the mill screw is through the use of a stack of bowed flat springs, each set of springs being rotated 90 degrees from the preceding set. One end of the spring stack is connected to the mill screw, while the opposite end is connected to a potentiometer. As the mill screw is turned to tighten the rolls in the stack, the spring stack is compressed as it turns. The position of the mill screw is then determined by the changed readings of the potentiometer. However, this design suffers from lack of precision in transmitting the information corresponding to the rotary rotation of the mill screw through the spring stack to the potentiometer which is fixed. Additionally, the spring stack and potentiometer lack the ruggedness required for sustained use in a metal processing application.

Another method for determining the position of the mill screw is to use a spline to follow the rotation of the mill screw. However, splines experience backlash which prevents the accurate measurement of the rotation of the mill screw. Backlash is the relative motion of mechanical parts caused by looseness, such as between a gear tooth and a gear space. A spline following the rotation of the mill screw will experience backlash such that the spline will follow the screw as it rotates in one direction, but if the direction is reversed, there will be a delay before the spline will again follow the rotation of the screw. The rotation of the screw without the spline following it results in errors in the measurement of the rotation of the mill screw. Therefore, accurate measurement of the rotation of the mill screw cannot be obtained through use of a spline that experiences backlash.

Thus, until the development of the present invention, no one has provided a means by which the accurate rotary motion of a rolling mill screw can be measured precisely and reliably.

SUMMARY OF THE INVENTION

The present invention overcomes the problems and deficiencies discussed above by providing an anti-backlash spline coupling which has the identical rotation as a spline shaft with which it is engaged. The anti-backlash spline coupling may comprise a top and bottom plate, connecting means for the plates, and tensioning means to bias the rotary movement of the plates. The tensioning means may comprise first and second coupling screws and a spring attached to the screws. Two springs, on opposite sides of the spline shaft, may also be provided. The connecting means may comprise a screw and a washer arranged in holes within the top and bottom plates.

A position measuring system may also be provided which measures the rotary motion of a workpiece subject to vertical and rotary motion. The position measuring system may include a spline shaft, means for attaching the shaft to the workpiece so that shaft has the same rotary and vertical motion as the workpiece, a spline coupling which engages the spline shaft, tensioning means within the spline coupling which biases the rotary motion of the spline coupling so it has the identical rotary motion as the shaft, gearing means which transmit the rotary motion of the spline coupling, an output shaft with the same rotary motion as the spline coupling, and means for measuring the rotary motion of the workpiece. The spline coupling may include a top and bottom plate with connecting means, particularly a screw and a washer arranged in holes within the top and bottom plates. The tensioning means may comprise first and second coupling screws and a spring attached to the screws. The attaching means may comprise an adaptor plate, a flange, a mandrel, a restraining collar including spring biased adjustment screws for moving the mandrel, and a flexible disc coupling. The flexible disc coupling may include a collet with slots, a locking clamp, and a disc spring. The gearing means may comprise a center gear disposed on a hollow shaft and an outboard gear which engages the center gear. The measuring means may comprise a resolver which rotates less than 360° for the maximum vertical motion of the workpiece.

BRIEF DESCRIPTION OF THE DRAWINGS

Various objects, features, and advantages of the present invention will be more fully appreciated as the same becomes better understood from the following detailed description of the present invention when considered in connection with the accompanying drawings, in which.

DETAILED DESCRIPTION OF THE PREFERRED EMBODIMENT

Figure 1:
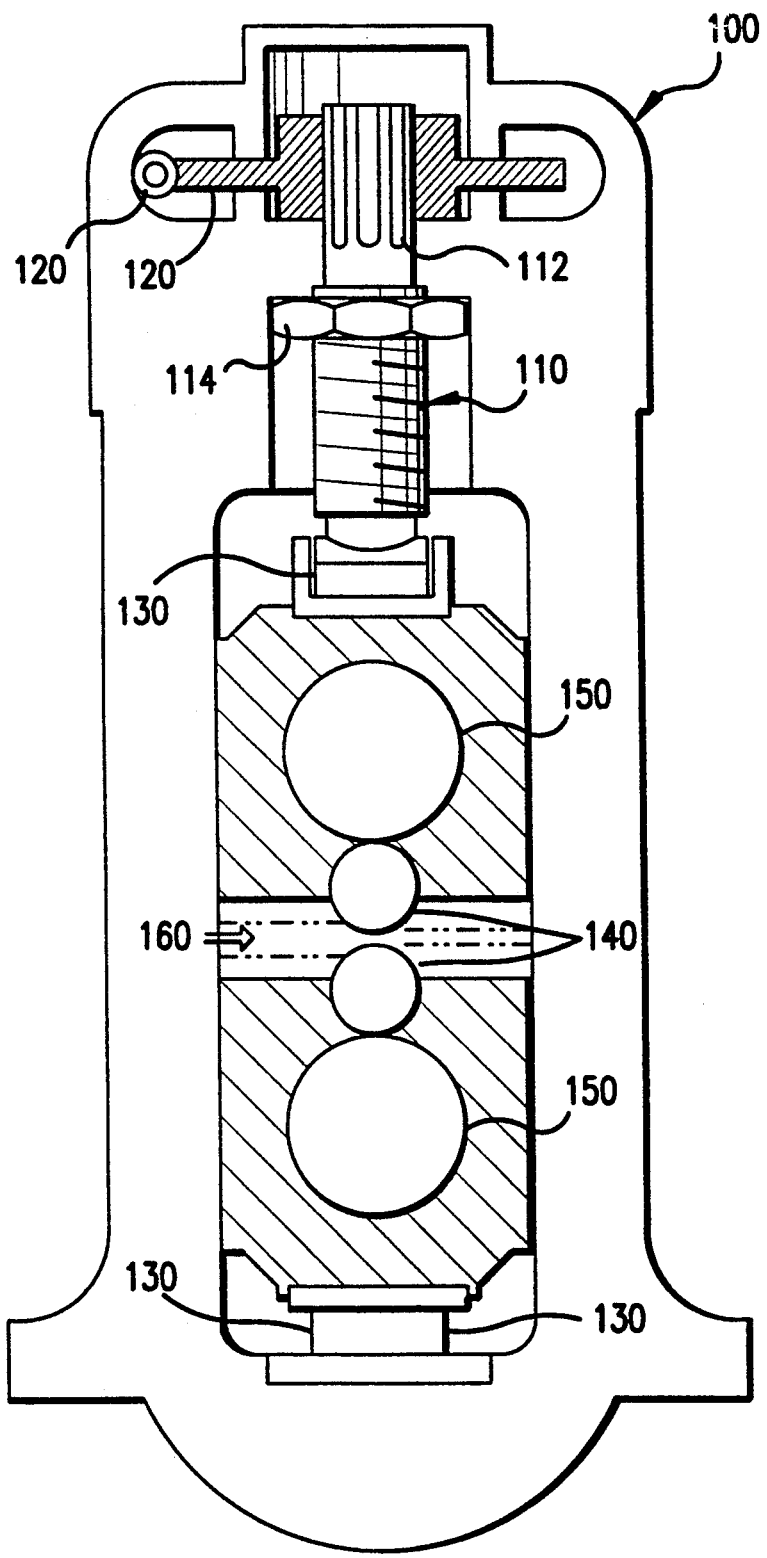
FIG. 1 shows a cross-sectional view of a rolling mill, including the rolling mill screw.

With continuing reference to the drawing figures in which similar reference numerals are used throughout the description to describe similar features of the invention, FIG. 1 shows a cross-sectional view of a rolling mill, including the rolling mill screw 110. The mill housing 100 contains the roll stack which is made up of two cylindrical work rolls 140 and two larger diameter cylindrical backup rolls 150. The work rolls compress the metal and the backup rolls stiffen the work rolls so they do not bow in the middle. The rolling mill screw 110 contains a spline end 112 which is driven by worm gear 120, and a threaded end which is received in nut 114. The mill screw is approximately one foot in diameter, usually threaded with a square thread of one inch pitch. Load cells 130 are often used to measure the roll separating force to permit control of the mill to produce a finished product of uniform thickness. As the metal enters the mill, it travels in the direction shown by arrow 160 and is reduced in thickness by the work rolls. Many types of metals, including steel, brass, and aluminum, are processed in this manner to produce metal of varying thicknesses, depending upon the vertical separation of the work rolls.

The position of the mill screw 110 determines the vertical separation between the work rolls 140 and hence the thickness of the material produced. Therefore, a precise determination of the position of the mill screw is required. As the mill screw is driven by the worm gear 120, the mill screw rotates, and moves vertically. The vertical position of the mill screw can be calculated from its rotary movement as the mill screw is threaded with an accurate pitch. For example, a mill screw with a one inch pitch will travel one inch in the vertical direction as it turns one revolution (360 degrees). If the mill screw moves down one inch, then the rolls have been closed together by one inch. Therefore, by measuring the rotary motion of the mill screw, the vertical position of the mill screw can be calculated, and hence, the separation of the work rolls can also be calculated.

The position measuring system 200 of the present invention attaches to the mill screw so that the rotation of the mill screw can be precisely and accurately measured by the resolver 250. The centering and alignment assembly 210 attaches a spline shaft 220 to the mill screw so that the spline shaft is aligned with the central longitudinal axis of the mill screw. So attached, the spline shaft has the same vertical and rotary motion as the mill screw. As the resolver is fixed, there must be a connection to the spline shaft that will isolate the rotary motion of the spline shaft (which is the same as that of the mill screw) while allowing the spline shaft to travel vertically with the mill screw.

The connection which isolates the rotary motion of the spline shaft is provided by the anti-backlash spline coupling 230. Gearing means 240 transmit the isolated rotary motion to the resolver for measurement. The anti-backlash spline coupling and the gearing means are also fixed, having no vertical movement, but the spline shaft moves vertically through them. The anti-backlash spline coupling is rotated by the spline shaft, and with the anti-backlash feature, has the identical rotation as the spline shaft. The gearing means are arranged such that the rotation of the anti-backlash spline coupling is transmitted to the resolver. The resolver then measures the rotation of the anti-backlash spline coupling, which is identical to the rotation of both the spline shaft and the mill screw. In this manner, the spline shaft can rotate and move vertically with the mill screw while its rotation is accurately isolated by the anti-backlash spline coupling for measurement by the resolver. Without the anti-backlash feature of the spline coupling, accurate measurement of the rotation of the mill screw could not be obtained due to errors in the measurement of the rotation of the spline shaft caused by backlash in the spline as discussed above under Background of the Invention.

Figure 2:
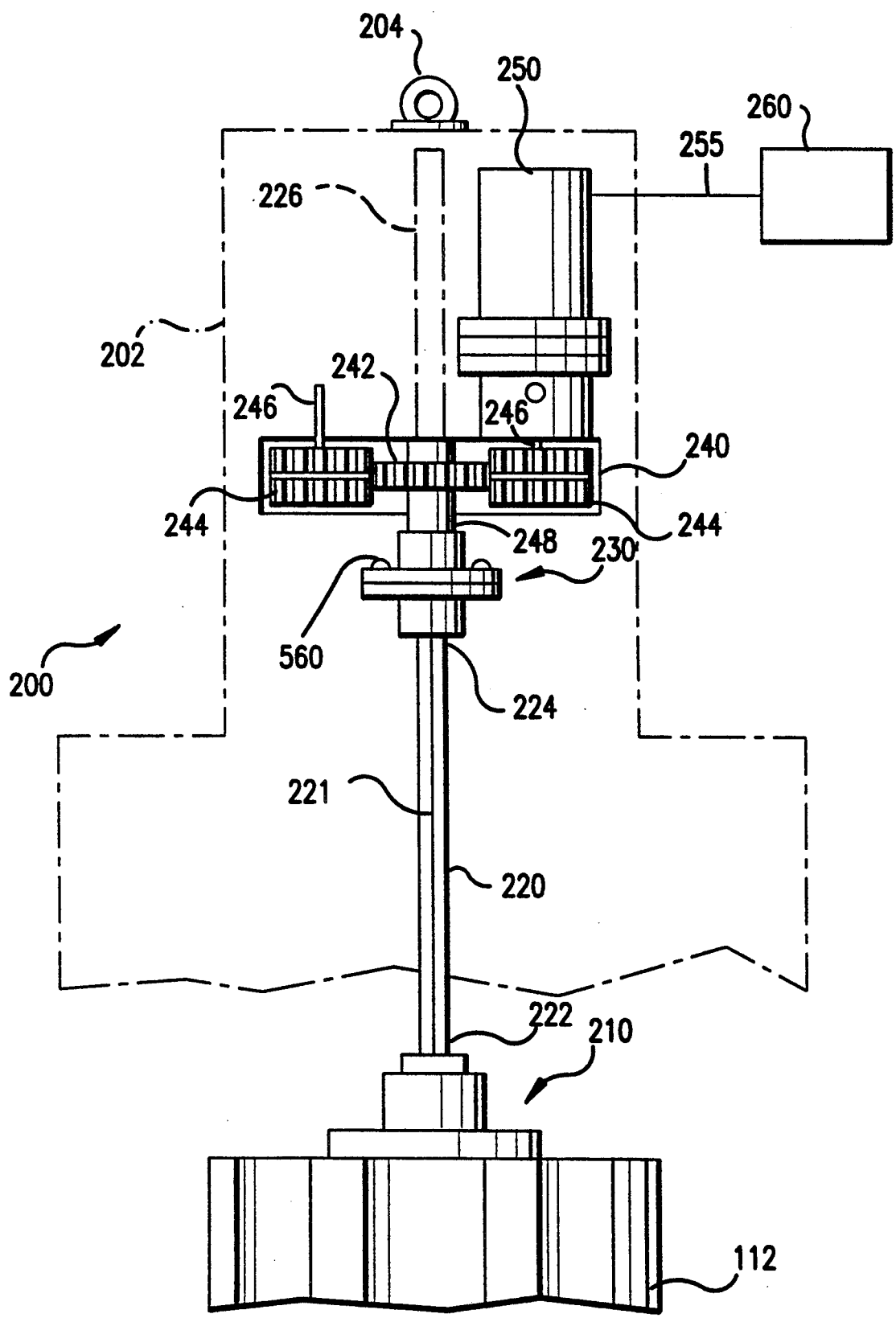
FIG. 2 shows a front view of the position measuring system connected to a rolling mill screw.
Figure 9:
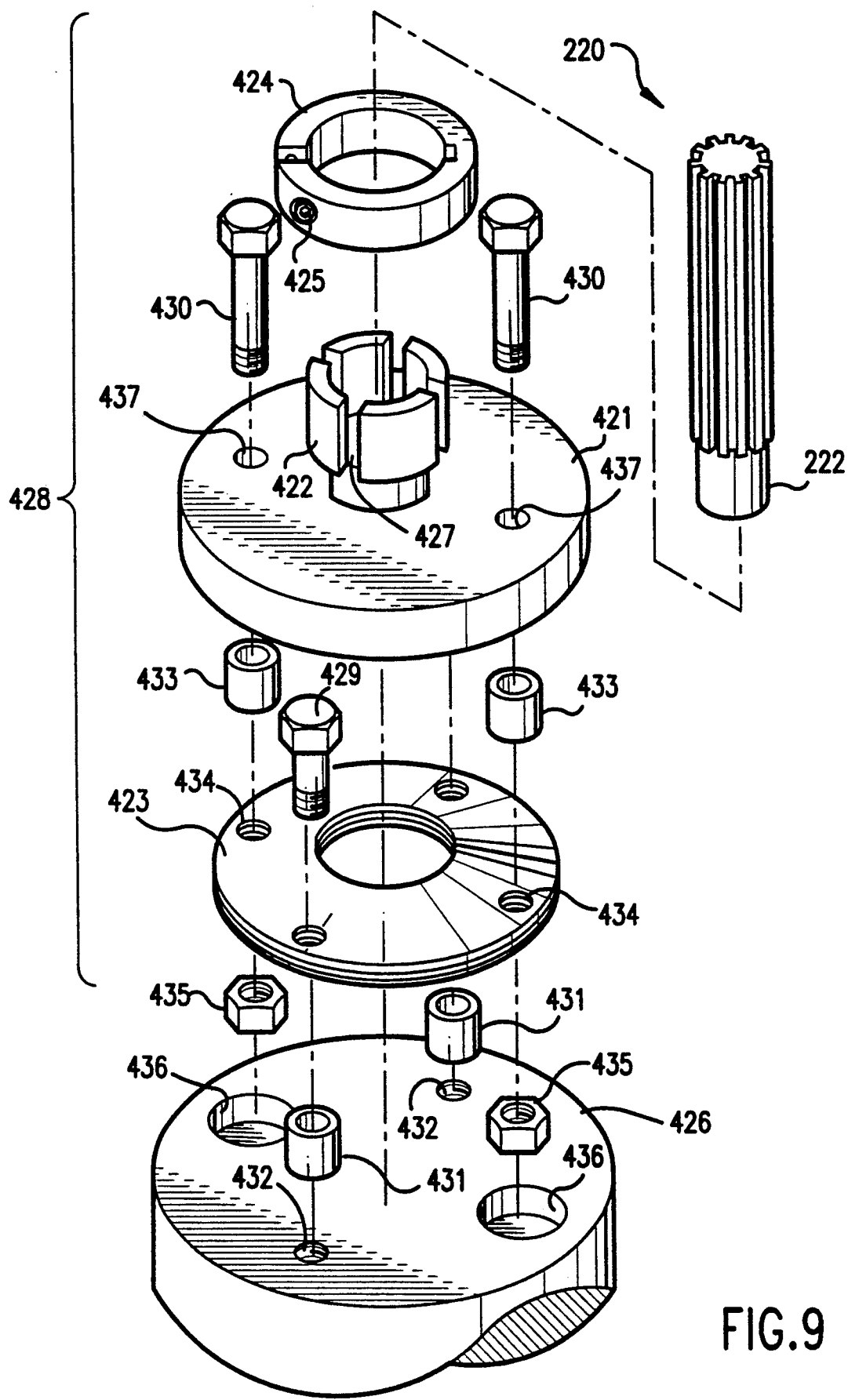
FIG. 9 is an exploded perspective view of the flexible disc coupling of the centering and alignment assembly shown in FIG. 8.

FIG. 2 shows a front view of the position measuring system 200 of the present invention connected to the spline end 112 of the mill screw. A cylindrical spline shaft 220 is attached at its screw end 222 to the mill screw by centering and alignment assembly 210, described further below. As best seen in FIG. 9, the screw end 222 of the spline shaft is smooth, and not splined, for attachment to the mill screw. The spline shaft has a splined outer surface 221. The number of keyways or splines on the spline shaft may vary, and is not limited to the precise number shown in the drawings. The vertical and rotary motion of the spline shaft 220 attached by the centering and alignment assembly follows the vertical and rotary motion of the mill screw.

The full up position of the spline shaft is shown within housing 202 at 226. The housing can be removed through use of eyebolt 204. Preferably, the housing has a removable section for access to the anti-backlash spline coupling 230. The spline shaft enters an anti-backlash spline coupling 230 at the location labeled 224. A hollow cylindrical shaft 248 connects the anti-backlash spline coupling 230 to the gear box 240. The hollow shaft 248 is locked to the spline coupling 230 so that the hollow shaft has the same rotary motion as the spline coupling. The hollow shaft 248 extends through the gear box 240, and the spline shaft 220 travels through the hollow shaft into and out of the gear box. There is clearance between the hollow shaft 248 and the spline shaft 220, and the hollow shaft does not contain any splines or keyways and does not engage the spline shaft.

A round center gear 242 is disposed on the hollow shaft inside the gear box. The center gear 242 engages round anti-backlash outboard gears 244 to drive output shafts 246. Preferably, center gear 242 is a pinion gear, and output shafts 246 are $\frac{1}{2}$" shafts. Each anti-backlash gear 244 is made up of two gears as is known in the art. The center gear to outboard gear ratio is preferably 1:1 so that the outboard gears and output shafts have the same rotary motion as the center gear. With the configuration as shown in FIG. 2, the center gear has the same rotary motion as the hollow shaft and the anti-backlash spline coupling. The anti-backlash spline coupling, described further below, has the same rotary motion as the spline shaft, which has the same rotary motion as the mill screw. Therefore, the output shaft has the same rotary motion as the mill screw.

A resolver 250 is connected to the output shaft 246. One or two resolvers can be used with the system, or a resolver and a limit switch can also be used. The resolver 250 measures the rotary motion of the output shaft 246, and therefore measures the rotary motion of the mill screw. A commercially available resolver, such as Model 3820-R Resolver Transducer produced by Carlen Controls, Inc. of Roanoke, VA, can be used. Preferably the resolver retains exact position throughout a power shutdown. One method of retaining the position information is to gear the resolver so that it does not make more than one 360 degree revolution for the maximum travel of the mill screw. That is, as the mill screw travels from its full up to its full down position, the resolver output is less than 360 degrees. For example, if the mill screw has a maximum travel distance of 20 inches, and the pitch of the screw is one inch, then the mill screw will rotate 20 turns for the maximum travel. The resolver is then geared so that one revolution output (360 degrees) of the resolver corresponds to an input of 20 turns.

A magnetic resolver can also be used with the position measuring system 200. One such magnetic resolver is described in commonly owned allowed U.S. patent application Ser. No. 07/655,308.

A ten wire cable 255 connects resolver 250 to conversion electronics 260. The rotary information measured by the resolver is transmitted to the conversion electronics via the cable 255. The conversion electronics 260 then converts the rotary information regarding the rotary motion of the mill screw into vertical position through use of the known pitch of the mill screw as discussed above.

Figure 3:
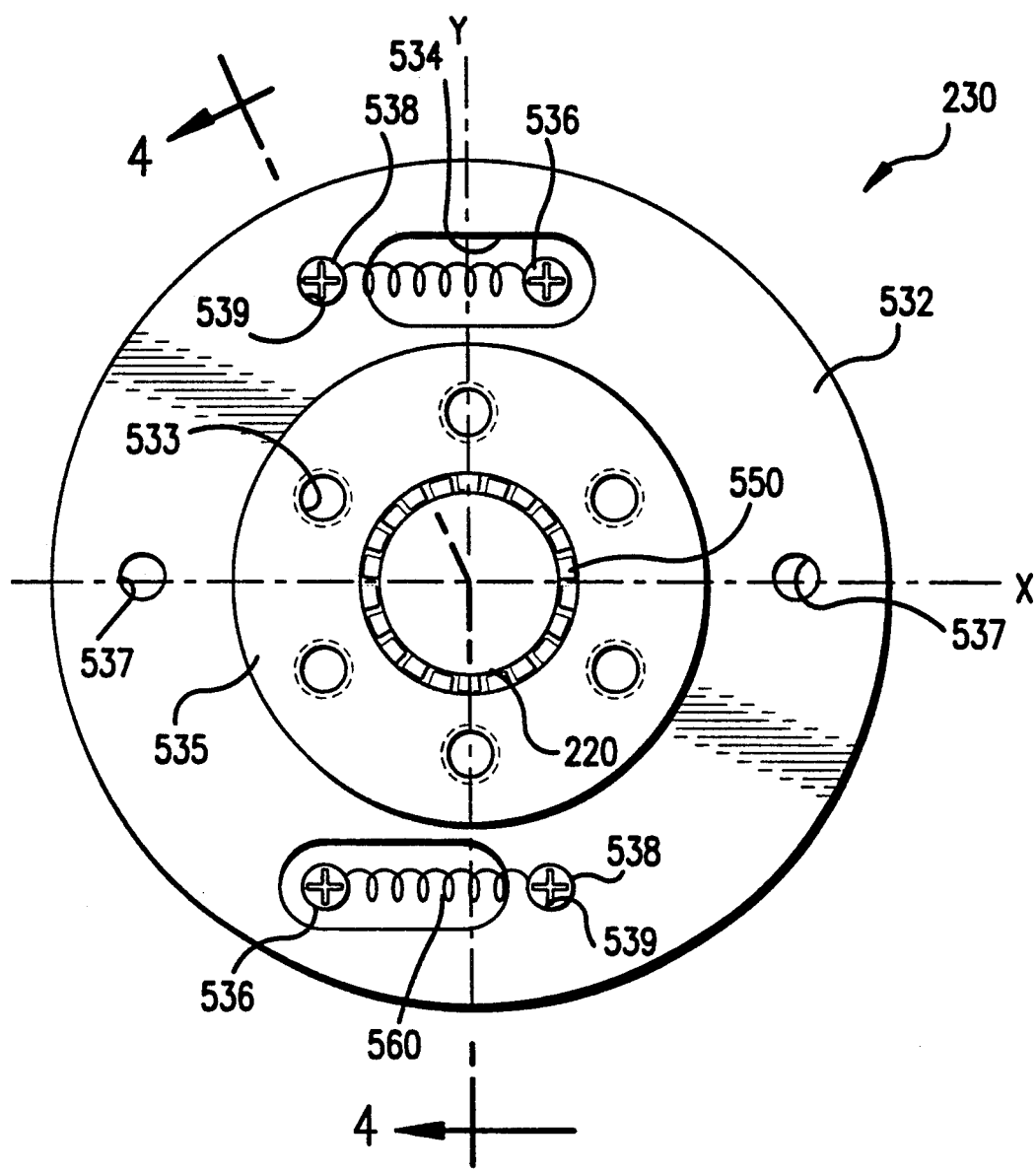
FIG. 3 is a top plan view of the anti-backlash spline coupling shown in FIG. 2.
Figure 4:
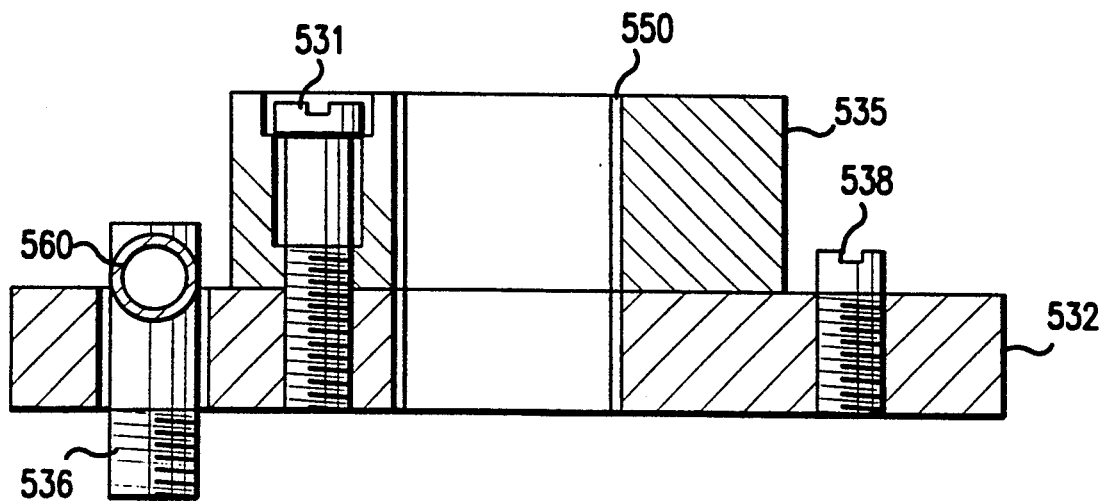
FIG. 4 is a cross-sectional view of the anti-backlash spline coupling taken along line 4—4 in FIG. 3.
Figure 6:
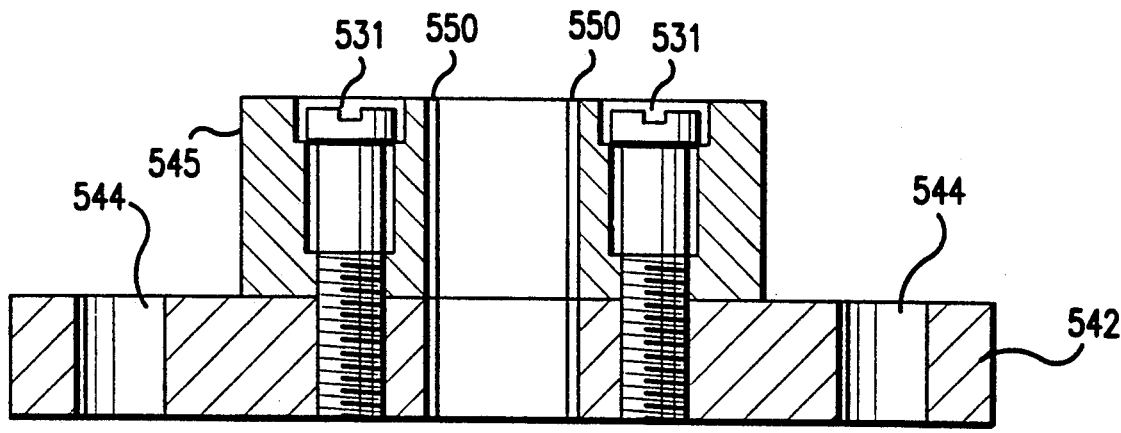
FIG. 6 is a cross-sectional view of the anti-backlash spline coupling taken along line 6—6 in FIG. 5.
Figure 5:
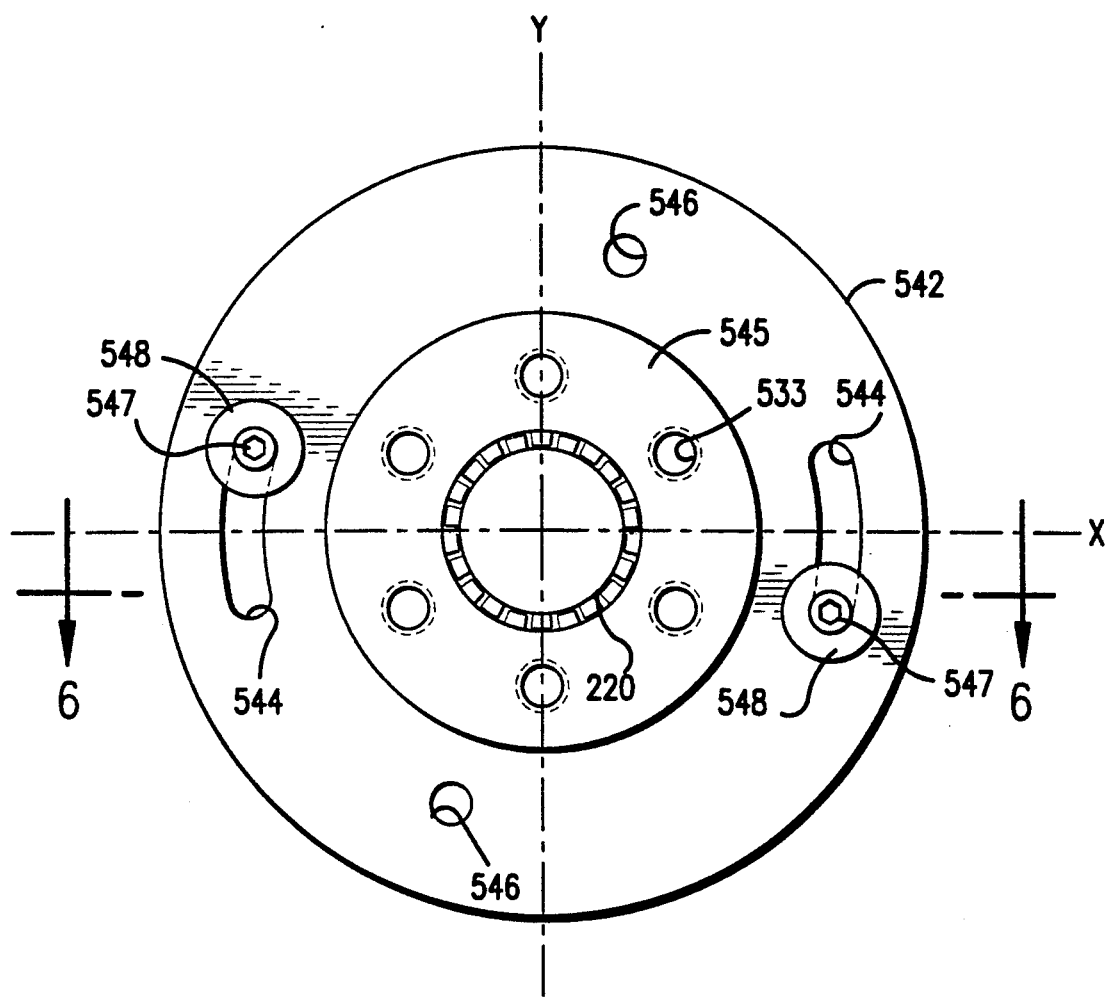
FIG. 5 is a bottom plan view of the anti-backlash spline coupling shown in FIG. 2.

As shown in FIGS. 3 through 6, the spline shaft 220 moves vertically through anti-backlash spline coupling 230. As seen in FIGS. 3 and 5, spline shaft 220 engages the internal spline 550 so that the spline shaft rotates as it moves vertically through the coupling. The number of keyways or splines in the internal spline may vary and is not limited to the precise number shown in the drawings. However, the internal spline must be configured to engage the spline shaft. The spline shaft rotates the coupling without backlash, that is, the coupling and the spline shaft have identical rotary motion, due to the tensioning means which will be further described below. A top view of the anti-backlash spline coupling 230 is shown in FIG. 3 and a bottom view is shown in FIG. 5. The anti-backlash spline coupling is comprised of a round top plate 532, which faces toward the gear box in FIG. 2, and a round bottom plate 542, which faces toward the mill screw in FIG. 2. As shown in FIGS. 3 and 5, orthogonal X and Y axes which intersect at the center of each plate can be drawn. The two plates, as well as cylindrical top hub 535 and cylindrical bottom hub 545, each have a round central opening which has a splined inner surface to form the internal spline 550. The internal spline 550 engages the splined outer surface 221 of the spline shaft so that the spline shaft is substantially perpendicular to the plates. Each hub is approximately 2.5 inches in diameter and 2.5 inches high. As shown in FIGS. 3,5, and 6, six screws 531 in counter-bored holes 533 are used to attach each hub to one of the plates. Although six counter-bored screws are shown, other arrangements can be used to connect the hubs to the plates.

The two plates 532 and 542 are connected parallel to each other so that the plates can have rotary movement with respect to one another, about an axis parallel to the spline shaft, in order to line up the splines to engage the spline shaft. Each plate is approximately 5 inches in diameter and 0.5 inch thick. As seen in FIGS. 5 and 6, the bottom plate 542 has two oblong holes 544. Each oblong hole 544 has a width of approximately 0.375 inch and a length of approximately 0.75 inch. Holes 544 are located approximately 90 degrees from holes 534 in top plate 532. One of holes 544 extends below the X axis of plate 542 by approximately 0.1875 inch, and the other hole extends above the X axis by the same amount. Connecting clamp screws 547 are inserted through washer 548 into oblong holes 544. The diameter of washer 548 is greater than the width of hole 544 so that the washer is retained on hole 544. Connecting clamp screws 547 extend through the washer 548 and through bottom plate 542 into round holes 537 in top plate 532. Round holes 537 are approximately 0.2 inch diameter and are located on the X axis of plate 532. As the plates are rotated relative to each other to line up the splines, the position of connecting clamp screw 547 in oblong hole 544 changes with the movement of the bottom plate. This connection allows the plates to be held together, but permits the rotary movement required to line up the splines before inserting the spline shaft.

The tensioning means which provide the anti-backlash feature can best be seen in FIGS. 3 and 4. The tensioning means is attached to the top plate and to the bottom plate as explained below. Top plate 532 is configured with two oblong holes 534 in which a coupling spring 560 is mounted. The width of hole 534 is approximately 0.625 inch and the length 1.73 inches. The holes are parallel to each other, with the internal spline located between the holes. One hole 534 is displaced off the Y axis in one direction by 0.173 inch and the other hole is displaced off the Y axis by 0.173 inch in the opposite direction. The coupling spring is attached to the top of two coupling spring shoulder screws. Each end of coupling spring 560 is circular, and the coupling spring screws are inserted through the circular ends to be held in place by the shoulder of the screws. The spring is preferably made of 0.04 inch thick plated wire. The outer diameter of the circular ends is approximately 0.424 inch. The overall length of the spring is approximately 1.240 inches, with the looped region approximately 0.54 inch long. Each coupling spring is held in place by one short coupling spring shoulder screw 538 and one long coupling spring shoulder screw 536 so that the spring is up out of the oblong hole 534 by approximately one-half the diameter of the spring. Preferably, the top plate has two coupling springs located on opposite sides of the spline shaft.

Short coupling spring shoulder screws 538 are inserted through round holes 539 in top plate 532 as shown in FIGS. 3 and 4. The diameter of holes 539 is approximately 0.2 inch. The body of short coupling spring shoulder screws 538 has a threaded region of approximately 0.375 inch and a non-threaded region of approximately 0.375 inch. Long coupling spring shoulder screws 536 are inserted through oblong holes 534 in top plate 532. The long coupling spring shoulder screws 536 extend through the top plate (as seen in FIG. 4) into holes 546 in bottom plate 542 as shown in FIGS. 3 and 5. The body of long coupling spring shoulder screws 536 has a threaded region of approximately 0.375 inch and a non-threaded region of approximately 0.625 inch. As the plates are rotated relative to each other to line up the splines and engage the spline shaft, the position of coupling spring shoulder screw 536 in the oblong hole 534 changes with the movement of the top plate. This stretches spring 560 to put it under tension. With the spline shaft 220 inserted in coupling 230, the spring 560 is under tension. Preferably, the spring is loaded to 1.8 pounds at 20% extension and to 3.3 pounds at 50% extension. This has the effect of biasing the rotary movement of the top plate against the rotary movement of the bottom plate so that the coupling is rotated by the spline shaft without backlash. That is, when the spline shaft is rotated in one direction, the coupling 230 follows the rotation, and, when the direction of the spline shaft is reversed, the coupling also follows the rotation without delay from slippage as the plates are prevented from slipping by the tension of the springs. The top plate and the bottom plate thus have the identical rotary motion as the spline shaft.

Figure 7:
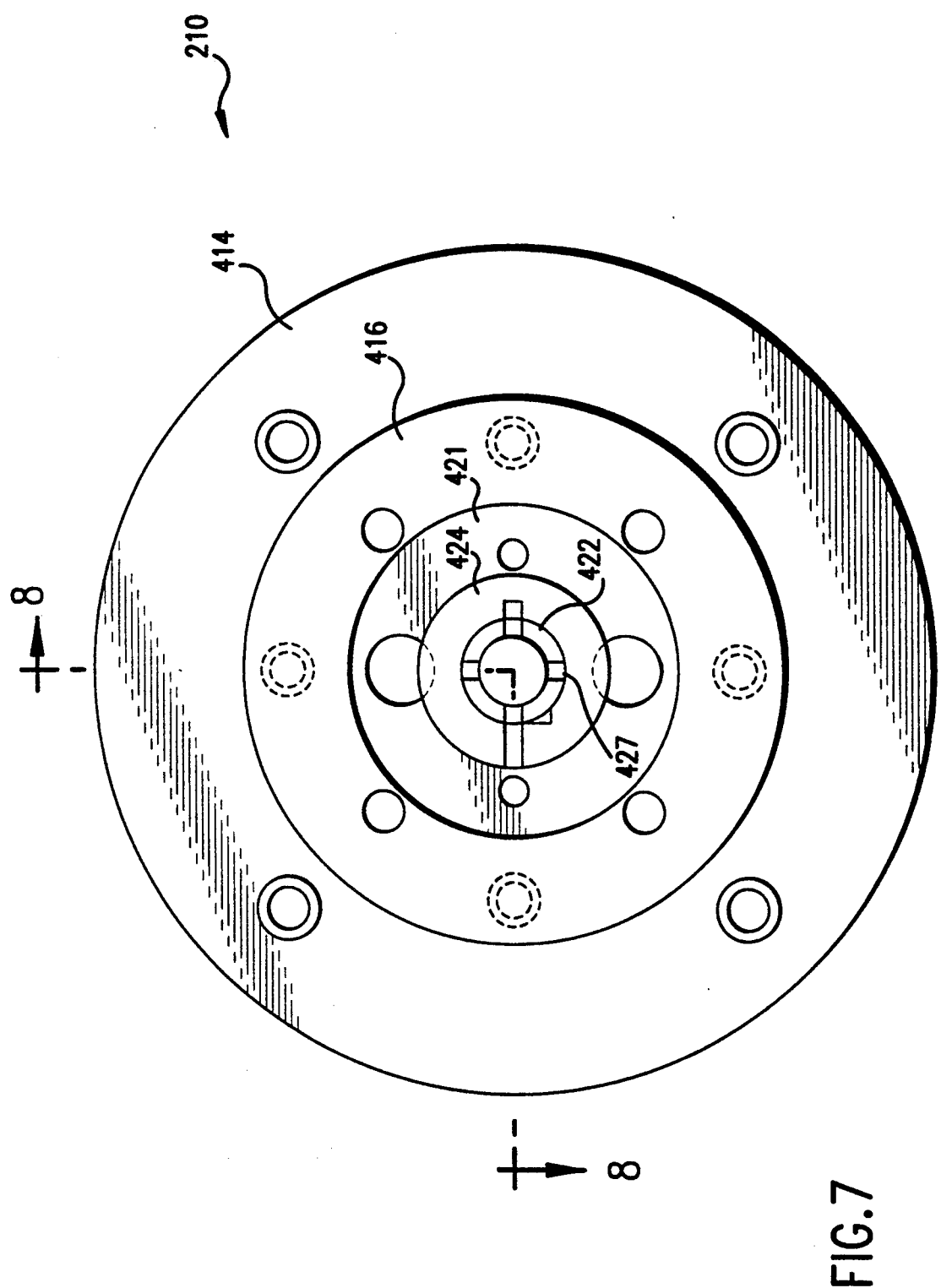
FIG. 7 is a top plan view of the centering and alignment assembly shown in FIG. 2.
Figure 8:
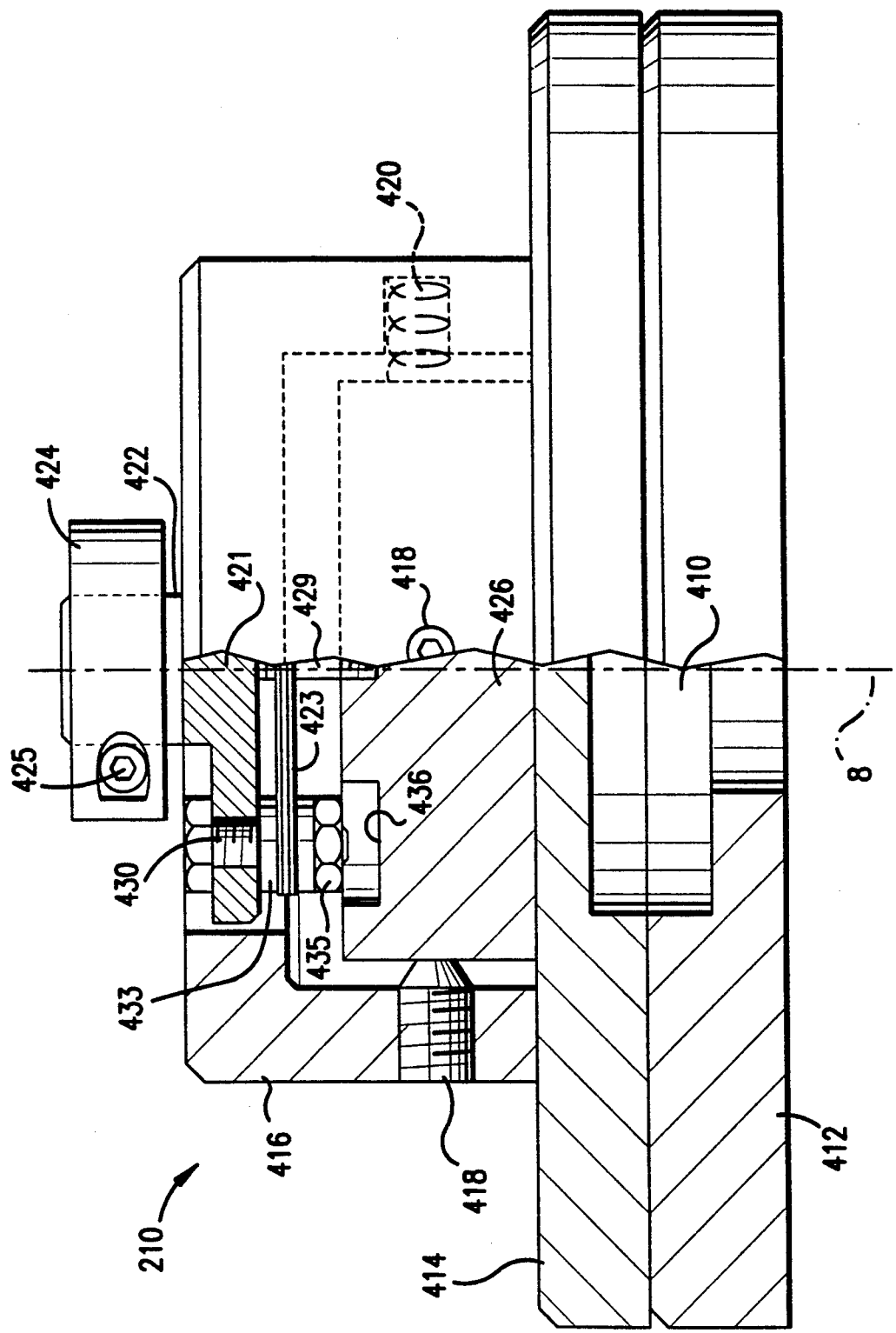
FIG. 8 is a cross-sectional view of the centering and alignment assembly taken along line 8—8 in FIG. 7.

The centering and alignment assembly, which connects the spline shaft 220 to the spline end of the mill screw 112 is shown in FIGS. 7 through 9. The centering and alignment assembly 210 attaches the position measuring system 200 to the mill screw. As will be explained more fully below, the centering and alignment assembly also provides a way to get the spline shaft 220 on perfect center with the mill screw, but yet provide some flexibility in the coupling with the mill screw.

FIG. 7 is a top plan view of the centering and alignment assembly 210. A cross-sectional view of the assembly is shown in FIG. 8. As best seen in FIG. 8, a round adaptor plate 412 is used to adapt the centering and alignment assembly 210 to the mill screw. A large bolt 410 is placed through the adaptor plate 412 to secure the assembly to the mill screw. A round centering and alignment flange 414 is placed over the adaptor plate 412. A cylindrical mandrel 426 is then placed on top of the centering and alignment flange 414 so that it is free to move. A U-shaped restraining collar 416 is then placed on the centering and alignment flange 414 to surround the mandrel 426. Two adjustment screws 418 are located 90 degrees apart in restraining collar 416 for movement of the mandrel. Each adjustment screw 418 is biased with a spring 420 so that the mandrel can be moved in two perpendicular directions through the use of only two screws. The spring biased adjustment screws provide for two axis positioning of the mandrel through the use of only two screws. A similar positioning device is described in U.S. Pat. No. 5,048,384 which is herein incorporated by reference.

The spline shaft 220 is attached to the mandrel 426 through a flexible disc coupling 428, as best seen in FIG. 9. A four layer circular disc spring 423 is attached to the mandrel 426 by two screws 429. These two screws are 180 degrees apart and pass through spacer 431 into threaded holes 432 in the mandrel. Spline shaft coupling 421 is disposed on top of the disc spring 423. Coupling 421 is connected to the mandrel by two bolts 430 which extend through holes 437 in the coupling and through holes 434 in the disc spring. Nut 435 is placed on bolt 430 with clearance holes 436 provided in mandrel 426.

Spline shaft coupling 421 contains a round collet 422, having slots 427, which receives the screw end 222 of the spline shaft. Four slots, each separated by 90 degrees, are provided. Locking clamp 424, which fits around collet 422, is tightened by screw 425 around collet 422 to hold the spline shaft in place. Slots 427 in collet 422 allow the locking clamp to squeeze the collet tighter around the spline shaft so that the spline shaft is securely attached to the mill screw. The disc spring provides flexibility to the coupling so that the spline shaft can bend to approximately 5 degrees from the mill screw alignment axis without breaking out of the coupling.

Through use of a magnetic dial gauge on the spline shaft (not shown), the mandrel 426 is moved by the two adjustment screws 418 in order to align the spline shaft with the central longitudinal axis of the mill screw. This process is similar to that described in U.S. Pat. No. 5,048,384 except that only two spring biased adjustment screws are required to align the mandrel. Once the spline shaft is aligned with the mill screw, then the vertical and rotary motion of the spline shaft will match that of the mill screw.

In operation, the system functions as follows. The system is first attached to the mill screw as described above so that the spline shaft 220 is aligned with the central longitudinal axis of the mill screw. As the mill screw 110 rotates and moves down to decrease the separation between the work rolls 140, the spline shaft also rotates and moves down. Conversely, as the mill screw rotates in the opposite direction and moves up to increase the separation between the work rolls, the spline shaft also reverses its direction of rotation and moves up.

As the splined surface 221 of the spline shaft is engaged with the internal spline 550 of the anti-backlash spline coupling 230, the spline shaft moves vertically through the coupling, and the spline shaft rotates the coupling. Due to the anti-backlash feature of the coupling, the rotation of the coupling will be identical to the rotation of the spline shaft. As the spline shaft 220 rotates the anti-backlash spline coupling 230, the springs 560 on the top plate 532 of the coupling bias the rotary movement of the top plate against the rotary movement of the bottom plate 542. When the spline shaft rotates clockwise, the coupling rotates immediately, without slipping, as one spring is biasing the coupling in the opposite (counter-clockwise) direction. When the spline shaft reverses direction to counter-clockwise, the coupling also rotates without slipping as the other spring is biasing the coupling in the opposite (clockwise) direction. Therefore, as the direction of rotation of the spline shaft (and the mill screw) changes, the direction of rotation of the anti-backlash spline coupling also changes, without the slipping and delay (backlash) seen in a conventional spline coupling.

The hollow shaft 248 is attached to the anti-backlash spline coupling 230 so that it is locked in place and has the same rotation as the coupling. The hollow shaft extends from the anti-backlash spline coupling up into the gear box 240. As the spline shaft is rotating, it is also moving vertically. The spline shaft moves freely through the hollow shaft as the hollow shaft has a larger diameter than the spline shaft and the hollow shaft is not splined. The spline shaft engages the internal spline 550 of the anti-backlash spline coupling so that the spline shaft also moves vertically through the coupling.

Within the gear box 240, center gear 242 is disposed on the hollow shaft so that the center gear also has the same rotation as both the hollow shaft and the anti-backlash spline coupling. As the anti-backlash spline coupling is rotated by the spline shaft 220, the hollow shaft 248 and the center gear 242 are also rotated. The center gear 242 engages an outboard gear 244 so that as the center gear 242 rotates, the outboard gear 244 also rotates. When the gear ratio of the center gear 242 to the outboard gear 244 is 1:1, one revolution of the center gear will result in one revolution of the outboard gear. The outboard gear 244 drives the output shaft 246 so that the output shaft has the same rotation as the outboard gear.

With the system connected as described above, the spline shaft 220 rotates the anti-backlash spline coupling so that the hollow shaft 248 and the center gear 242 are also rotated. The center gear then rotates the outboard gear 244 which rotates the output shaft 246. Thus, the output shaft has the same rotation as the spline shaft. As the spline shaft has the same rotation as the mill screw, the output shaft has the same rotation as the mill screw. The resolver 250 measures the rotation of the output shaft 246. Hence, the resolver measures the rotation of the mill screw.

The invention which is intended to be protected herein should not be construed as limited to the particular forms disclosed, as these are to be regarded as illustrative rather than restrictive. The position measuring system described herein can be used with any workpiece that is subject to vertical and rotary motion. Various types of rotary measurement means can be employed, other than a resolver. Various gear ratios or transmission means can be employed to transmit the rotary rotation from the anti-backlash spline coupling to the resolver or other rotary measurement means. Further, other connecting means can be used to connect the plates in the anti-backlash spline coupling so that they can have rotary movement with respect to each other. Finally, various attachment means can be used so that the spline shaft is aligned with the mill screw.

Variations and changes may be made by those skilled in the art without departing from the spirit of the invention. Accordingly, the foregoing detailed description should be considered exemplary in nature and not limited to the scope and spirit of the invention as set forth in the following claims.

What is claimed is:

1. A position measuring system, comprising:
   a shaft having an outer surface which is splined;
   means for attaching said shaft to a workpiece subject to vertical motion and rotary motion about a central axis such that said shaft has the same rotary and vertical motion as said workpiece;
   a spline coupling including a central opening having a splined inner surface which engages said splined surface of said shaft such that said shaft moves vertically through said spline coupling and said shaft rotates said spline coupling;
   tensioning means disposed in said spline coupling, said tensioning means biasing the rotary motion of said spline coupling so that said spline coupling and said shaft have identical rotary motion;
   gearing means connected to said spline coupling for transmitting the rotary motion of said spline coupling;
   an output shaft connected by said gearing means to said spline coupling so that said output shaft has the same rotary motion as said spline coupling; and
   means for measuring the rotary motion of said workpiece connected to said output shaft.

2. A position measuring system as recited in claim 1, wherein said spline coupling further comprises:
   a top plate defining a central opening having a splined inner surface which engages said splined surface of said shaft such that said shaft moves vertically through said top plate;
   a bottom plate defining a central opening having a splined inner surface which engages said splined surface of said shaft such that said shaft moves vertically through said bottom plate; and
   connecting means which connect said top plate and said bottom plate.

3. A position measuring system as recited in claim 2, wherein said tensioning means comprises:
   a first coupling screw disposed in said top plate;
   a second coupling screw disposed in said top plate and extending into said bottom plate;
   a spring having two ends, a first end of said spring attached to said first coupling screw, and a second end of said spring attached to said second coupling screw.

4. A position measuring system as recited in claim 3, wherein said connecting means comprises:
   a connecting screw;
   a washer; and
   said top plate defining a top hole and said bottom plate defining a bottom hole so that said washer is retained on said bottom hole and said connecting screw extends through said washer and said bottom hole into said top hole.

5. A position measuring system as recited in claim 3, wherein said means for attaching further comprises:
   an adaptor plate affixed to said workpiece;
   a flange disposed on top of said adaptor plate;
   a mandrel movably disposed on said flange;
   a restraining collar surrounding said mandrel, said restraining collar including two spring biased adjustment screws for moving said mandrel, each of said spring biased adjustment screws located 90 degrees from the other so that each of said spring biased adjustment screws moves said mandrel in a direction perpendicular to the direction of movement of said mandrel by the other said spring biased adjustment screw; and
   a flexible disc coupling attached to said mandrel for receiving said shaft, said flexible disc coupling including,
   a collet having slots,
   a locking clamp for tightening said collet around one end of said shaft, and
   a disc spring disposed between said collet and said mandrel.

6. A position measuring system as recited in claim 3, wherein said gearing means comprises:
   a hollow shaft attached to said spline coupling;
   a center gear disposed on said hollow shaft so that said hollow shaft and said center gear have the same rotary motion as said spline coupling; and
   an outboard gear connected to said output shaft which engages said center gear.

7. A position measuring system as recited in claim 3, wherein said means for measuring comprises a resolver, wherein said resolver rotates less than 360 degrees for the maximum vertical motion of said workpiece.

8. A position measuring system as recited in claim 2, wherein said connecting means comprises:
   a connecting screw;
   a washer; and
   said top plate defining a top hole and said bottom plate defining a bottom hole so that said washer is retained on said bottom hole and said connecting screw extends through said washer and said bottom hole into said top hole.

9. A position measuring system as recited in claim 1, wherein said means for attaching comprises:
   an adaptor plate affixed to said workpiece; and
   a flange disposed on top of said adaptor plate.

10. A position measuring system as recited in claim 9, wherein said means for attaching further comprises:
    a mandrel movably disposed on said flange;
    a restraining collar surrounding said mandrel, said restraining collar including two spring biased adjustment screws for moving said mandrel, each of said spring biased adjustment screws located 90 degrees from the other so that each of said spring biased adjustment screws moves said mandrel in a direction perpendicular to the direction of movement of said mandrel by the other said spring biased adjustment screw; and
    a flexible disc coupling attached to said mandrel for receiving said shaft, said flexible disc coupling including,
    a collet having slots, a locking clamp for tightening said collet around one end of said shaft, and a disc spring disposed between said collet and said mandrel.

11. A position measuring system as recited in claim 1, wherein said gearing means comprises:

a hollow shaft attached to said spline coupling;

a center gear disposed on said hollow shaft so that said hollow shaft and said center gear have the same rotary motion as said spline coupling; and an outboard gear connected to said output shaft which engages said center gear.

12. A position measuring system as recited in claim 1, wherein said means for measuring comprises a resolver, wherein said resolver rotates less than 360 degrees for the maximum vertical motion of said workpiece.

* * * * *